United States Patent [19]

Stuemky et al.

[11] Patent Number: 4,990,125
[45] Date of Patent: Feb. 5, 1991

[54] FLAT BELT, BELT DRIVE, AND METHOD

[75] Inventors: Robert E. Stuemky, Franktown; Jon A. Johnston, Northglenn, both of Colo.

[73] Assignee: The Gates Rubber Company, Denver, Colo.

[21] Appl. No.: 464,059

[22] Filed: Jan. 12, 1990

[51] Int. Cl.$^5$ ............................................. F16G 1/10
[52] U.S. Cl. ................................. 474/261; 474/262
[58] Field of Search ........................... 474/260–263, 474/58, 59, 237, 238, 268; 428/224, 225, 245, 246

[56] References Cited

U.S. PATENT DOCUMENTS

| 1,888,480 | 11/1932 | Storm et al. | 474/58 X |
| 2,183,258 | 12/1939 | Harman | 474/58 |
| 3,181,690 | 5/1965 | Jenkins | 474/262 X |
| 3,820,409 | 6/1974 | Meadows | 474/262 |
| 3,863,515 | 2/1975 | Meadows | 474/262 |
| 4,305,713 | 12/1981 | Imamura | 474/238 |
| 4,449,959 | 5/1984 | Matsumura | 474/238 |
| 4,721,498 | 1/1988 | Grob | 474/261 |

Primary Examiner—Thuy M. Bui
Attorney, Agent, or Firm—H. W. Oberg, Jr.; C. H. Castleman, Jr.

[57] ABSTRACT

A flat type power transmission belt with an embedded tensile member of first and second plies of yarns where a first layer of yarns is disposed at a first helical angle and a second layer of yarns is disposed at an opposite helical angle. A method for making flat belts by making a sleeve and embedding a tensile member therein by winding a first plurality of yarns at a first helical angle and then winding a second plurality of yarns in a second layer at an opposite helical angle.

15 Claims, 2 Drawing Sheets

FLAT BELT, BELT DRIVE, AND METHOD

BACKGROUND OF THE INVENTION

The invention relates to machine elements and mechanisms, but more particularly, the invention relates to a flat belt and a belt drive where the belt is of the type with some degree of elasticity in a lengthwise direction of the belt.

U.S. Pat. No. 1,307,731 to Gates discloses a power transmission belt and its method of manufacture where the belt is of the flat, elastomeric type that exhibits some degree of elasticity in a lengthwise direction of the belt. The belt has a tensile member of embedded fibrous material of a square woven fabric cut on a bias and with threads of the fabric forming opposite helical angles in relation to the belt. The tensile member is in the form of a spirally wound volute that forms at least four successive layers. The achievable control over elasticity is substantially limited because: (1) the threads of the bias fabric are interwoven with each other which substantially inhibits their relative movement to each other; (2) the threads of the square woven fabric always form an angle of substantially 90 degrees in relation to each other; and (3) the successive four spiraled plies of square woven fabric are required to "pantograph" and stretch to a greater extent than the previous ply as the belt is bent around pulleys which induces increasing strain in the successive plies.

Flat belts entrained about pulleys whose axis are substantially parallel define a power transmission drive or system and an example of such a drive is referred to in the aforementioned Gates patent. Such a drive is incapable of increasing belt tension to accommodate power transmission loads that require a tension which is greater than the installed belt tension. The belt of the '731 patent has some degree of elasticity in its lengthwise direction and therefore exhibits a spring rate which affects the initial belt installation tension. This is because the pulleys of such a drive are customarily locked and the length of the belt path is constant. Any permanent belt stretch results in a decrease in belt tension. Such drives have limited power transmission capabilities without the aid of another device such as a spring biased belt tensioner with a moveable pulley that engages the belt for the sole purpose of maintaining belt tension.

Flat belts are used in other power transmission drives where the axes of the pulleys are not parallel. A drive where the axes are spaced apart and the plane of the axis are turned in relationship to each other is known as a turned drive. A drive where the axes are turned 90 degrees in relation to each other is known as a "quarter turn drive." Flat belts used on a turned drive must follow a twisted path between the pulleys and the twisting induces various degrees of belt edge strain and, because of this, belts used in these drives usually do not have an embedded tensile member per se. Most of such belts are made of a solid elastomeric material which, in the "vinacular" are referred to as the "rubber band" type. Some flat belts have a covering of bias ply fabric. Both types of such belts have some degree of elasticity and hence, when installed around the pulleys effects the belt installation tension. Some drives of the quarter turn type use a frustoconical pulley for the driver pulley which has the advantage of giving the drive some degree of self tensioning as the belt was able to move up the frustoconical pulley for changes in power transmission load. As a belt moves up to a larger part of the cone of the pulley, the path length of the belt increases which effects an increase in belt tension. The self tensioning features of such a drive are typically limited to the use of a frustoconical pulley and the inherent capability of the belt to effect movement on the frustoconical pulley.

SUMMARY OF THE INVENTION

A power transmission belt of the flat type is provided in accordance with the invention where the belt is of the elastomeric type that includes an embedded tensile member that gives the belt a degree of elasticity in a lengthwise direction of the belt. The tensile member is formed of first and second layers of circumjacent yarns that are oriented generally transversely of the belt between its oppositely facing sides. One layer of yarns is disposed at a helical angle that is from about 25 to about 80 degrees, and a second layer of yarns is disposed at a opposite helical angle that is from about 25 to about 80 degrees. An optional feature of the belt resides in the oppositely facing V-sides which operate as a means for relieving belt bending stresses.

A power transmission drive is provided which exhibits self-tensioning without the aid of frustoconical pulleys even though such pulleys may be used in accordance with the invention. The power transmission drive is of the turned type where the axis of the driver pulley and driven pulley are turned to form an angle relative to each other. The belt of the invention is entrained around the driver pulley and driven pulley to follow a twisted path. In operation, a belt has a tight side span and a slack side span where the belt twists around the driver pulley from a leading direction and exits the driver pulley in an angular trailing direction. The embedded layers of circumjacent yarns disposed at opposite helical angles operate as a means for tensioning the belt around a driver pulley which may be of the cylindrical type, frustroconical type, or crowned type.

In accordance with the method of the invention, a belt sleeve is made by forming and embedding a tensile member in the belt sleeve while layering belt materials together to form the sleeve. A tensile member is formed by winding a first plurality of yarns in a first layer at a first helical angle and then winding a second plurality of yarns in a second layer at an opposite angle from the first helical angle. After curing, belts are severed from the sleeve.

An object of the invention is to provide a belt having some degree of elasticity in the lengthwise direction and which elasticity can be variously controlled within limits by an embedded tensile member.

Another object of the invention is to provide a power transmission belt of the flat type that includes means for reducing bending stresses at its edges when operated around pulleys.

Another object of the invention is to provide a belt that has some degree of inherent twist where the twist is in the same direction as the turned axis of a power transmission drive in which the belt is to operate.

Still another object of the invention is to provide a power transmission drive that includes a flat belt where the embedded tensile member of the belt operates as a means for self-tensioning the drive at various power levels.

Yet another object of the invention is to provide a method for manufacturing a flat type belt with an embedded tensile member where the manufacturing process enables the belt to have desired ranges of elasticity in a lengthwise direction of the belt.

These and other objects or advantages of the invention will be realized after reviewing the drawings and descriptions thereof wherein.

DESCRIPTION OF THE PREFERRED EMBODIMENTS

Figure 1:
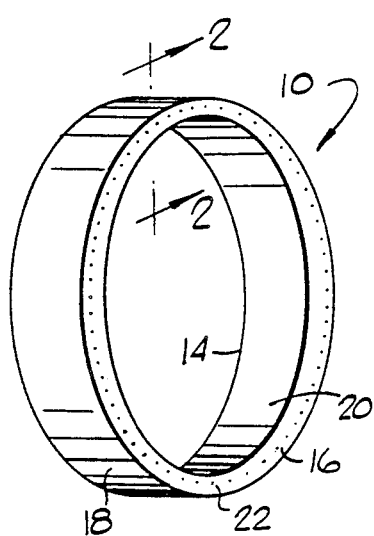
FIG. 1 is an isometric view of a belt of the invention.
Figure 2:
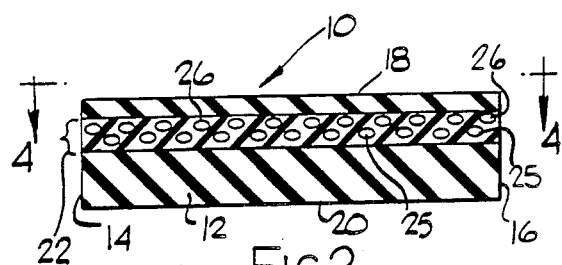
FIG. 2 is an enlarged cross-section of the belt taken along the lines 2—2 of FIG. 1.

Referring to FIGS. 1-4, a power transmission belt 10 of the invention is provided. The belt is of the flat type with an elastomeric body 12 with oppositely facing sides 14, 16, an outer surface 18, and a power transmission inner surface 20. The body may be made of any suitable elastomer such as the natural and synthetic rubbers or blends thereof; millable polyurethane; or the likes thereof.

Figure 4:
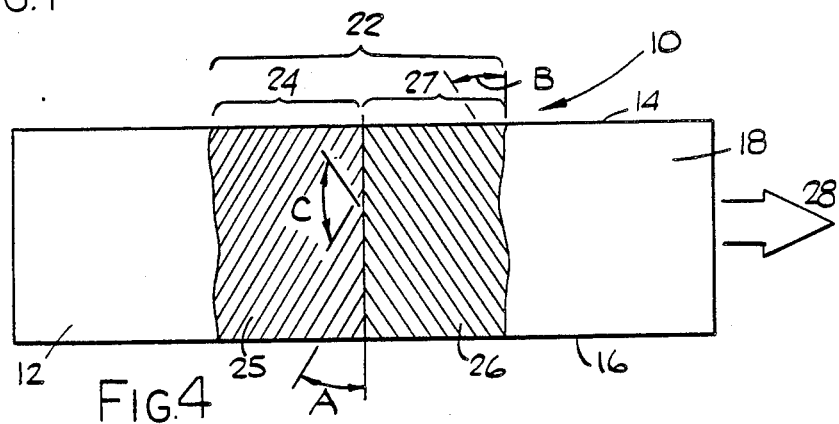
FIG. 4 is a partial cutaway view taken along the line for 4—4 of FIG. 2 showing a tensile member as embedded in an elastomeric body of the belt.

A tensile member 22 of fibrous material is embedded in the body. The tensile member is made of a first layer 24 of circumjacent yarns 25 oriented generally transversely in relation to the belt. The yarns extend between the oppositely facing sides and are at a helical angle A that is in a range from about 25 to about 80 degrees. The second layer 27 of circumjacent yarns 26 is juxtaposed the first layer and is oriented generally transversely in relation to the belt. The yarns 26 extend between the oppositely facing sides and are at a helical angle B in relation to the belt that is from about 25 to about 80 degrees. The yarns of the first and second layers form an included angle C in relation to each other that is from about 20 to about 130 degrees. Large helical angles A, B give the belt a lesser degree of elasticity than smaller angles A, B in relation to the lengthwise direction 28 of the belt. The yarns are of the fibrous type such as those made by twisting fibers together in one direction to form a yarn ply. Two or more yarns or plies may be twisted together in the opposite direction to form a cord. Also, the fibers may be of any of the suitable types such as the synthetic fibers aramid, nylon, polyester, rayon, and the like, or even may include the natural occuring fibers such as cellulose. For purpose of illustration, the yarns in FIG. 4 are disposed at opposite helical angles A and B of 32 degrees for use with an exemplary power transmission drive of the invention as later explained.

Figure 3:
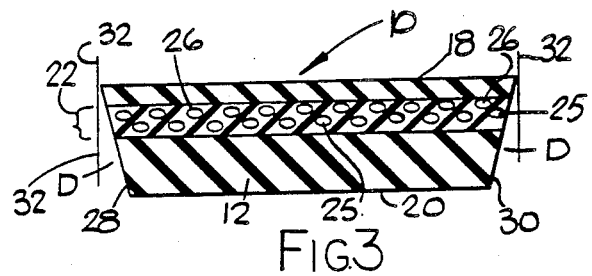
FIG. 3 is a view similar to FIG. 2 but showing an alternate form of the invention.

Referring to FIG. 3, the oppositely facing sides of the belt may be in the form of oppositely facing V-sides 28, 30 which define a means for relieving bending stresses in the elastomer of the belt body such as when a belt is bent around pulleys and this feature will be further explained in conjunction with the power transmission drive. The V-sides are at an angle D in relation to a vertical 32 to the outer surface 18. The oppositely facing V-sides of a cross-section of the belt and as shown in FIG. 3, form an angle D that is from about 10 to about 35 degrees.

Figure 5:
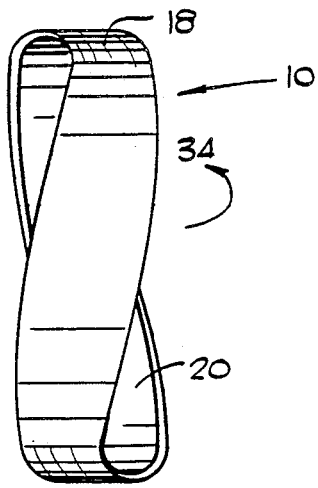
FIG. 5 is a front view of the belt of FIG. 1 where opposite spans of the belt are pressed together to show how the belt has an inherent twist in the lengthwise direction of the belt.

Referring to FIG. 5, the embedded tensile member of the first and second layers of yarns define a means for inducing an inherent twist 34 and in lengthwise direction of the belt when opposite spans of the belt are pressed together. When the layering of yarns of the first and second layer are disposed as shown in FIG. 4, the inherent twist is in the counter clockwise direction. If the layering is reversed at opposite helical angles in each layer, then the inherent twisting is in the clockwise direction. Such inherent twisting is suitable for application on a turned drive where the belt must follow a twisted path.

Figures 6, 7:
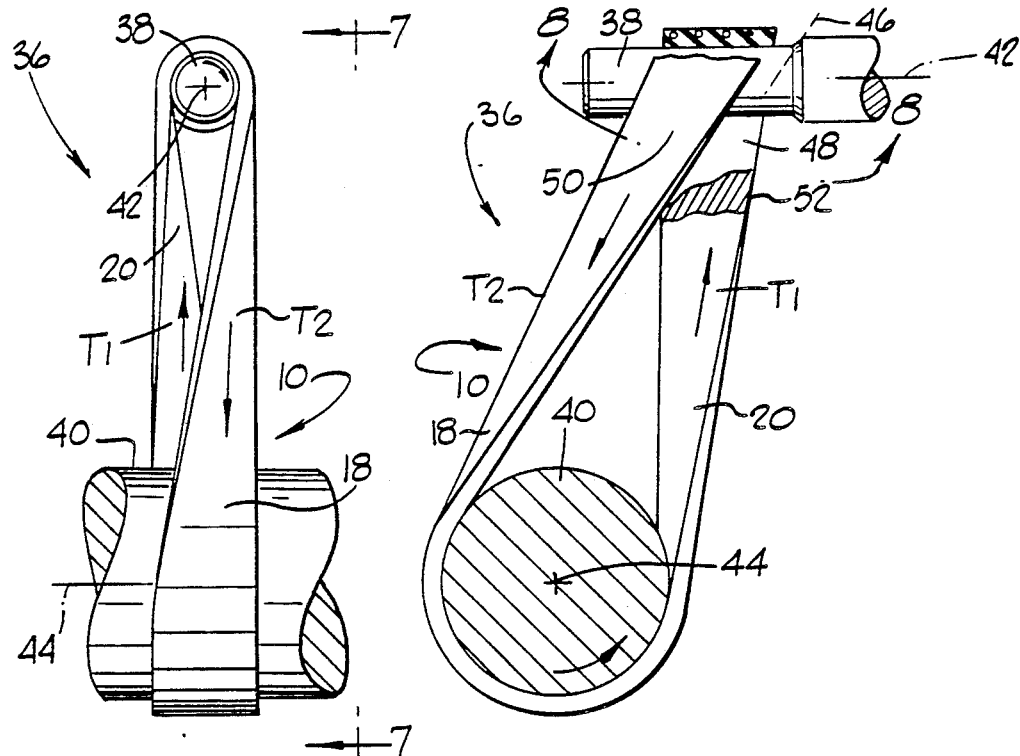
FIG. 6 is a front view of a quarter turn drive showing the belt of the invention entrained about a driver pulley and a driven member.
FIG. 7 is a view taken along the line 7—7 of FIG. 6 and showing the belt partially cutaway.

Referring to FIGS. 6-7, a power transmission drive 36 has a power transmission belt 10 that is twisted and entrained around a driver pulley 38 and a driven member 40. As shown, both the driver pulley and driven pulley are of the cylindrically shaped type although other shapes may be used. The illustrated drive is of the quarter turn type where the driver pulley has an axis 42 that is rotated 90 degrees with respect to the axis 44 of the driven member. For purposes of illustration, arrows are used to show the direction of belt travel and rotation of the driver pulley and driven member.

In operation, the belt will seek some position on the driver pulley for some power load at the driven member and the belt will have a tight side span T1 and a slack side span T2. The belt will remain in the shown position until there is a change in power requirement at the driven member. Changes in power levels such as an increase in torque, results in the belt moving to a new position on the driver pulley (ie., to the right as shown by dotted lines 46 in FIG. 7). This is opposite in direction for that observed with prior art belts which move to the left for the same drive configuration. There is a change in belt length at the new position which results in an increase in the drive tension to support the increase in power requirements at the driven member. The embedded tensile member of the invention acts as a means for inducing the belt to move and increase tension in the drive.

The tight side stand T1 enters the driver pulley from a leading direction 48 of the tight side span, and exit the driver pulley in an angular, trailing direction 50 toward the slack side stand T2. The first and second layers of yarns define a means for tensioning the belt during operation of the drive by inducing a force that laterally moves the belt along the driver pulley in the leading direction of the tight side span.

Self-tensioning results whether the yarns are disposed as shown in FIG. 4 or, if the helical angles are reversed. However, it is preferable for the example drive that the yarns be disposed as shown in FIG. 4 to exhibit the inherent twist as shown in FIG. 5. When this is done, the yarns in the layer closest to the power transmitting inner surface are oriented 52 toward the leading direction of the tight side span and this acts to enhance the amount of self-tensioning. The belt will move less toward the leading direction of the tight side span (ie, to the right) when the helical angle of the yarns of the first layer are reversed (not shown).

Figure 8:
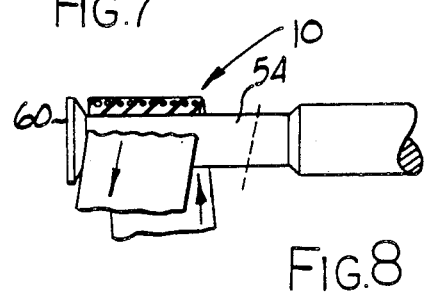
FIG. 8 is a view taken along the line 8—8 of FIG. 7 and showing an alternate form of the invention.
Figures 9, 10, 11:
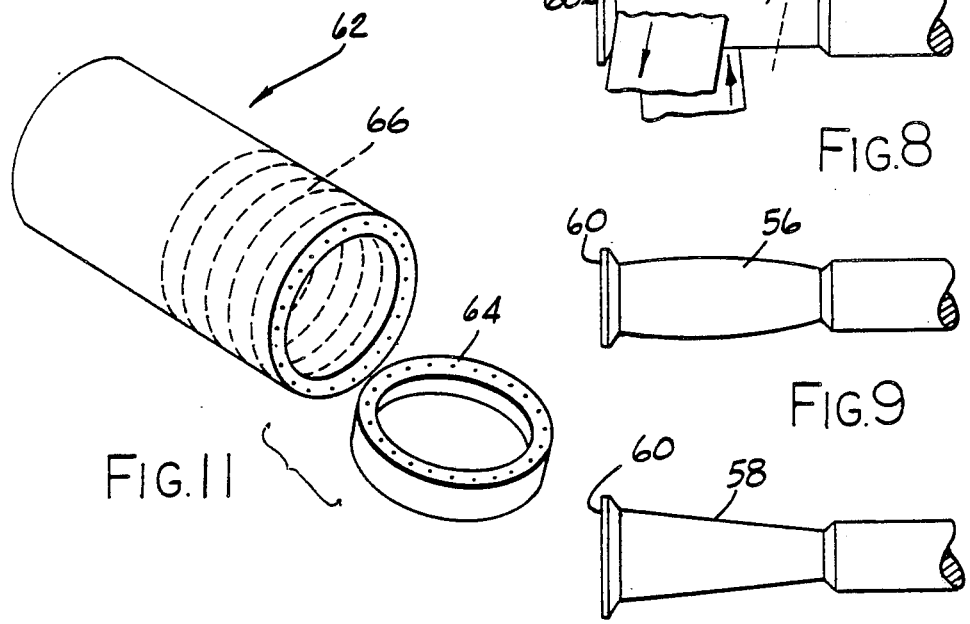
FIG. 9 is a view similar to FIG. 8 and showing an alternate view of the invention.
FIG. 10 is a view similar to FIG. 9 and showing an alternate form of the invention.
FIG. 11 is an illustration of a method for making the belts of the invention and shows an isometric view of a belt sleeve with individual belts severed from the sleeve.

As previously mentioned, the belt drive of the invention may use several different pulley configurations such as the cylindrical pulley configuration 54 of FIG. 8, the crowned pulley configuration 56, of FIG. 9, and the frustoconical pulley configuration 58 of FIG. 10. The pulleys of FIGS. 8–10 show an optional embodiment in the form of a radial flange 60 at one end of the pulley which is opposite the direction that the belt travels in its self-tensioning mode. The flange defines a secondary surface for engaging one of the oppositely facing sides of the belt for improved belt performance in the case where it is possible to stall the belt when the power requirements at the driven member are too high. At stall, there is insufficient tension to carry the power load which results in slippage between the driver pulley and belt. When this happens, the tension in the tight and slack side spans becomes substantially the same causing the belt to move to the left as shown in FIG. 8. When the belt contacts the flange, the additional driving surface acts to restore some tight side tension back in the belt so that it can move to the right and in the drive position of FIG. 7.

To illustrate the improved performance resulting from the oppositely facing V-sides (FIG. 3) tests were conducted using the power transmission drive of FIG. 6 and 7 with a frustoconcial driver pulley of FIG. 10. The belts that were 0.710 in wide at the outer surface and 0.650 wide at the inner surface with the oppositely facing V-sides (Angle D=17 degrees) and were reinforced with 1000 denier yarns at 19 ends per inch per layer. At a driver pulley speed of 12,000 rpm and at a power load of about $\frac{1}{8}-\frac{1}{4}$ HP, the belts with V-sides operated for more than 400 hours whereas belts of identical construction except for square cut sides, (the belt of FIG. 2) operated for less than 50 hours.

Method

The belt of the invention is made using some known fabricating technics. Plies of belt material are applied over a mandrel that has an outside diameter that approximates the size of a desired finish belt. The belt may be made in either the upright or the inverted position but the upright position is preferred. Either the inner or outer surface of the belt body is first made by wrapping elastomeric material around the mandrel. The tensile member is formed by winding a first plurality of yarns at a first helical angle over the elastomeric material where the first helical angle is from about 25 to about 80 degrees. Optionally, an intervening layer of elastomeric material may be wrapped over the first plurality of yarns. A second plurality of yarns is wound over the first layering of yarns at an opposite helical angle that is from about 25 to about 80 degrees. The yarns of the first and second layers form an included angle in relation to each other that is from about 20 degrees to about 130 degrees as best illustrated in FIG. 4. Another layering of elastomeric material is applied over the tensile member and the belt sleeve 62 is cured in known fashion. Thereafter, individual belts 64 are severed 66 from the sleeve to complete the process.

The yarns may be applied individually in each layer such as by spiralling yarns around the elastomeric body or alternatively, the yarns may be in the form of rubberized tire cord stock where strips of cords made of yarns are individually wrapped around the body at opposite helical angles following the wrapping teaching shown in the '731 Gates patent.

The oppositely facing V-sides may be first square cut, or, they may be cut at angles of 10 to about 35 degrees when they are severed from the sleeve.

The foregoing detailed description is provided for purposes of illustration only and it is not intended to limit the scope of the invention which is to be determined by the appended claims.

What is claimed is:

1. In a power transmission belt of the flat type with an elastomeric body and oppositely facing sides; an outer surface; a power transmitting inner surface; and a tensile member of embedded, fibrous material with fibers thereof forming opposite helical angles in relation to the belt and giving the belt some degree of elasticity in a lengthwise direction of the belt, and wherein the improvement comprises:
    a first layer of circumjacent yarns oriented generally transversely in relation to the belt and extending between the oppositely facing sides, and wherein the yarns of the first layer are at a first helical angle that is from about 25 to about 80 degrees; and
    a second layer of circumjacent yarns juxtaposed the first layer and oriented generally transversely in relation to the belt, extending between the oppositely facing sides and wherein the yarns of the second layer are at a second helical angle that is opposite the first helical angle and is from about 25 to about 80 degrees.

2. The power transmission belt as claimed in claim 1 and further comprising a means for relieving bending stresses in the elastomer of the belt at the oppositely facing sides wherein the means includes the sides formed as oppositely facing V-sides.

3. The power transmission belt as claimed in claim 2 wherein the oppositely facing sides of a cross section of the belt, form an angle that is from about 10 to about 35 degrees in relation to a vertical to the outer surface.

4. The power transmission belt as claimed in claim 1 wherein the first and second layers of embedded yarns in conjunction with the elastomeric body define a means for inducing an inherent twist in the lengthwise direction of the belt.

5. The power transmission belt as claimed in claim 1 wherein the first and second helical angles are each substantially 32 degrees.

6. The power transmission belt as claimed in claim 1 wherein the yarns of the first and second layers form an included angle in relation to each other that is from about 20 degrees to about 130 degrees.

7. In a power transmission drive of the turned type with a driver pulley that is rotatable about an axis and a driven member that is rotatable about an axis that is spaced from and turned in relation to the driver pulley axis, and a belt of the elastomeric flat type entrained around the pulley and driven member and following a twisted path, the belt with oppositely facing sides, an outer surface, a power transmitting inner surface, and wherein the improvement comprises:
    a tensile member of fibrous material embedded in the belt between the inner and outer surfaces, the tensile member comprising:
    a first layer of circumjacent years oriented generally transversely in relation to the belt and extending between the oppositely facing sides, and wherein the yarns of the first layer are at a first angle that is from about 25 to about 80 degrees; and a second layer of curcumjacent yarns juxtaposed the first layer and oriented generally transversely in relation to the belt, extending between the oppositely facing sides and wherein the yarns of the second layer are at a second helical angle that is opposite the first helical angle and is from about 25 to about 80 degrees, wherein the tensile member gives the belt some degree of elasticity in the lengthwise direction.

8. The power transmission drive as claimed in claim 7 and further comprising a means for relieving bending stresses in the elastomer of the belt at the oppositely facing sides wherein the means includes the sides formed as oppositely facing V-sides.

9. The power transmission drive as claimed in claim 7 wherein the oppositely facing sides in a cross section of the belt form an angle that is from about 10 to about 35 degrees in relation to a vertical to the outer surface.

10. The power transmission drive as claimed in claim 7 wherein the entrained belt defines a tight side span and a slack side span between the driver pulley and driven member for a direction of belt travel and where the belt twists around the driver pulley such that the belt enters the driver pulley from a leading direction of the tight side span and exits the driver pulley in an angular, trailing direction toward the slack side span, and wherein the first and second layers of yarns define a means for tensioning the belt during operation of the drive by inducing a force that laterally moves the belt along the driver pulley in the leading direction of the tight side span.

11. The power transmission belt as claimed in claim 10 wherein the yarns in the layer closest to the power transmitting inner surface are oriented toward the leading direction of the tight side span.

12. The power transmission drive as claimed in claim 7 wherein the driver pulley is of the type selected from the group consisting of cylindrical pulleys, crowned pulleys and frustoconical pulleys.

13. The power transmission drive as claimed in claim 12 wherein the driver pulley has a radial flange having a side portion that defines a secondary surface for engaging one of the oppositely facing sides of the belt.

14. The power transmission drive as claimed in claim 7 wherein the first and second layers of embedded yarns in conjunction with the elastomer of the belt define a means for inducing an inherent twist in the belt that is in the same direction as the turn of the axes of the belt drive.

15. The power transmission drive as claimed in claim 7 wherein the axes are turned substantially 90 degrees in relation to each other.

* * * * *